(12) United States Patent
Koch et al.

(10) Patent No.: US 9,071,913 B2
(45) Date of Patent: Jun. 30, 2015

(54) NETWORK SYSTEM FOR AUDIO EQUIPMENT, METHOD AND COMPUTER PROGRAM

(75) Inventors: Hartwig Koch, Hildesheim (DE); Holger Kiehne, Peine (DE); Florian Klingler, Munich (DE); Frank Hofmann, Hildesheim (DE); Gerald Spreitz, Laatzen (DE); Sascha Jakoblew, Hildesheim (DE); Radu Circa, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 13/508,571

(22) PCT Filed: Sep. 22, 2010

(86) PCT No.: PCT/EP2010/063959
§ 371 (c)(1),
(2), (4) Date: Jun. 28, 2012

(87) PCT Pub. No.: WO2011/054596
PCT Pub. Date: May 12, 2011

(65) Prior Publication Data
US 2012/0258751 A1    Oct. 11, 2012

(30) Foreign Application Priority Data
Nov. 9, 2009  (DE) .......................... 10 2009 046 544

(51) Int. Cl.
*H04B 7/00*   (2006.01)
*H04W 72/04*  (2009.01)
(Continued)

(52) U.S. Cl.
CPC ............. *H04R 29/007* (2013.01); *H04H 20/61* (2013.01); *H04R 2227/003* (2013.01);
(Continued)

(58) Field of Classification Search
CPC ................................ H04W 36/00; H04W 4/00
USPC ........ 455/452.1, 450, 556.1, 67.11, 551, 509, 455/452.2, 569.1; 381/10, 58
See application file for complete search history.

(56) References Cited

U.S. PATENT DOCUMENTS

| 8,744,087 B2 * | 6/2014 | Bodley et al. ................... 381/10 |
| 2007/0117580 A1 | 5/2007 | Fehr |

(Continued)

FOREIGN PATENT DOCUMENTS

| CN | 2274854 | 2/1998 |
| CN | 1846456 | 10/2006 |

(Continued)

OTHER PUBLICATIONS

PCT/EP2010/063959 International Search Report dated Feb. 21, 2011 (Translation and Original, 4 pages).

*Primary Examiner* — John J Lee
(74) *Attorney, Agent, or Firm* — Michael Best & Friedrich LLP

(57) ABSTRACT

Wireless microphone systems are used, for example, in theater, stage performances, television, broadcast radio or in concerts to amplify voices or instruments for a large audience. Due to the plurality of actors or musicians, a corresponding number of audio channels is required to transmit the audio information. 20 to 50 audio channels can thus be required in a parallel mode even in common applications. The invention relates to a network system (1) for audio equipment (4) having a plurality of base stations (3) and having a plurality of microphone modules (4) wherein the microphone modules (4) are and/or can be allocated to the base stations (3) via configuration data and wherein each microphone module (4) of a microphone-module-base-station allocation is designed to transmit audio information on a transmitting frequency F1, F2, F3, F4, FX, FY to the allocated base station (3) of the same microphone-module-base-station allocation, wherein the base stations (3) are networked to one another such that the configuration data are interchangeable, having a control device (2), wherein the control device (2) is designed in respect of programming technology and/or circuit technology to automatically adapt the configuration data of the base stations (3) and/or microphone modules (4) and/or microphone-module-base-station allocations. The control device (2) is designed to adapt the configuration data in consideration of measured and/or calculated interactions of the microphone-module-base-station allocations and/or in consideration of the intended use of the respective microphone module (4).

21 Claims, 2 Drawing Sheets

(51) Int. Cl.
*H04R 29/00* (2006.01)
*H04H 20/61* (2008.01)
*H04W 24/02* (2009.01)
*H04W 24/10* (2009.01)
*H04W 88/08* (2009.01)
*H04R 27/00* (2006.01)

(52) U.S. Cl.
CPC ...... *H04R 2227/009* (2013.01); *H04R 2420/07* (2013.01); *H04W 24/02* (2013.01); *H04W 24/10* (2013.01); *H04W 88/08* (2013.01); *H04R 27/00* (2013.01)

(56) References Cited

U.S. PATENT DOCUMENTS

2007/0149246 A1\* 6/2007 Bodley et al. .............. 455/556.1
2009/0233617 A1   9/2009 Bjarnason et al.
2012/0281848 A1\* 11/2012 Koch et al. ...................... 381/58

FOREIGN PATENT DOCUMENTS

CN    101047408    10/2007
DE    10035824     2/2002

\* cited by examiner

NETWORK SYSTEM FOR AUDIO EQUIPMENT, METHOD AND COMPUTER PROGRAM

BACKGROUND

The invention relates to a network system for audio equipment comprising a number of base stations and a number of microphone modules, wherein the microphone modules are allocated and/or can be allocated to the base stations via configuration data and wherein each microphone module of a microphone module-base station allocation is designed for transmitting audio information on a transmitting frequency to the associated base station of the same microphone module-base station allocation, wherein the base stations are networked together so that the configuration data are exchangeable, and comprising a control device, wherein the control device is designed in the form of a program and/or a circuit to adapt the configuration data of the base stations and/or of the microphone modules and/or of the microphone module-base station allocations in automated manner. The invention also relates to a method for configuring a or the network system and to a computer program.

Wireless microphone systems are used, for example, in theater, stage performances, television, broadcast radio or in concerts to amplify voices or instruments for a large audience. Due to the plurality of actors or musicians, a corresponding number of audio channels is required to transmit the audio information. 20 to 50 audio channels can thus be required in a parallel mode even in common applications.

A typical wireless microphone system consists of a transmitter and a microphone which jointly form one unit, and a receiver which receives the audio information conveyed by the transmitter. To forward the audio information, for example, to amplifiers, recording devices etc., analog and digital interfaces are used such as XLR and AES/EBU. To forward the configuration data, it is possible to access the receiver via an interface from an external device. Conventional interfaces are, for example, CAN, USB or Ethernet.

So that the microphone systems can transmit the audio signals independently and free of interference from one another, it is customary that different transmitting frequencies can be set in the transmitters. In simple systems, the transmitting frequencies are defined, for example, via adjusting devices; in more elaborate systems, the transmitting frequency can also be set via the interface at the receiver.

A system for controlling transmitting and/or receiving devices which are mobile and connected wirelessly to a central processing unit is disclosed, for example, in printed document DE 100 358 24 A1 which probably forms the closest prior art. In this printed document, a system is described which has a plurality of radio microphones which are connected with respect to data to a central processing unit, wherein the data flow is arranged to be bidirectional so that data can be sent from the central processing unit in the direction of the radio microphones. The data can be, for example, the values of transmitting frequencies via which the radio microphones send audio information to the central processing unit. By means of the central processing unit, a higher-level management, selection and control of the operating parameters of the wireless transmission links is possible. For example, it is possible to switch manually or automatically to a spare frequency when a frequency provided is disturbed.

SUMMARY

According to the invention, a network system for audio equipment is proposed wherein the audio equipment is designed at least partially as microphone modules, especially as wireless microphone modules. However, other audio equipment can also be implemented as loudspeakers, particularly in-ear loudspeakers, monitor loudspeakers etc. The network system is particularly suitable and/or designed for controlling and/or parameterizing microphone modules for theater performances, television shows, concerts, discussions or other situations.

The network system comprises a number of base stations and a number of such microphone modules, wherein the microphone modules are allocated and/or can be allocated to the base stations, especially optionally via configuration data. The microphone modules have a microphone and a transmitter by means of which they can communicate wirelessly with the base station allocated. In a simple embodiment of the invention, the communication is unidirectional so that only audio information is conveyed from the microphone module on one transmitting frequency to the base station allocated. In other embodiments, the communication is bidirectional wherein audio information and/or configuration and/or status data can be transmitted and/or are transmitted on the one or the number of supplementary channels, especially return channels. It is also possible that there is a channel for the transmission of status data such as, e.g., battery or energy level information from the microphone module to the base station.

The base stations are networked with one another so that the configuration data and optionally in supplementary manner the status data can be exchanged with one another or with a control device. The networking can be carried out as a line, as a ring, as a star or in another topology. A connection via the Internet is also conceivable. The protocol of the networking can be proprietary and/or based, for example, on the IP protocol. The networking can be carried out via a series of wire-connected and/or wireless interfaces. Possible examples of this are CAN, USB, Ethernet or Bluetooth, DECT, GSM etc. An independent format is also conceivable.

The network system also has the control device, wherein the control device is configured as a program and/or as a circuit in order to select and/or adapt the configuration data of the base stations and/or of the microphone modules and/or of the microphone module-base station allocations in automated manner. During the selection, the control device renders a configuration proposal which can then be adjusted arbitrarily at the base stations and/or microphone modules, e.g. also manually. If necessary, the control device renders a configuration proposal which can then be adapted arbitrarily manually. After a release after the manual adaptation, it can be provided that the manually adapted configuration proposal is implemented in automated manner. In the automated adaptation, the adjustment is carried out automated at the base stations and/or at the microphone modules. The control device can be arranged, on the one hand, as an additional function at one of the base stations so that this base station forms a master in the network system. Alternatively, the control device can also be taken over by another device, for example by a PC. It is also possible that each of the base stations has such a control device, wherein the individual control devices agree cooperatively via the configuration data.

Within the context of the invention, it is proposed, according to a first option, that the control device selects or carries out, respectively, the adaptation of the configuration data taking into consideration measured and/or calculated interactions of the microphone module-base station allocations. This option takes into consideration that radio-based microphone modules can mutually interfere if their transmitting frequencies and/or their transmitting power are selected unfavorably with respect to one another. In the case of unfavorable combinations, intermodulation products or cross modulations can arise which disturb the quality of reception of the microphone modules affected in the frequency domain of the intermodulation products. For this reason, it is advantageous if the microphone modules are arranged in intermodulation-free frequencies with respect to one another. However, since the disturbances are dependent on a multiplicity of boundary conditions such as, e.g., the transmitting power or the local vicinity of other microphone modules, it is preferred that the configuration data are adapted to one another taking into consideration measured and/or calculated interactions of the microphone module-base station allocations.

In the case of another option which can be implemented alternatively or in a supplementary manner, the control device is configured for adapting the adaptation of the configuration data taking into consideration the purpose of use of the respective microphone module. In this aspect of the invention, attention is paid to the fact that not every purpose of use of a microphone module is equivalent in the transmission. For example, in concerts, transmissions by soloists are more important than the transmission of background voices or instruments. E.g., the microphone modules having the greater importance are assigned the configuration data which guarantee a better and/or more reliable transmission quality.

Whilst the intended use and the interactions can be taken into consideration independently of one another in simple embodiments of the invention during the adaptation of the configuration data, it is advisable in more complex embodiments that both influencing variables are taken into consideration jointly during the adaptation of the configuration data. Thus, it appears to be appropriate, for example, to assign configuration data in which there are only small interactions with other microphone module-base station allocations to microphone modules having a greater importance.

By means of the proposed network system, an intelligent and high-quality configuration data management can be implemented. Due to an improved coordination of the configuration data, the control device can adjust the individual microphone module-base station allocations in such a manner that by this means an advantageous compromise is achieved with regard to the quality of transmission of all microphone modules, the utilization of frequencies and/or the prioritization of individual microphone modules.

In particular, the control device is designed for keeping a list of the, preferably all available base stations, the, preferably all available microphone modules and a list of the, preferably all available transmitting frequencies.

In a preferred development of the invention, the configuration data comprise a microphone module-base station allocation, a transmitting frequency, a transmitting power and/or transmission parameters. The microphone module-base station allocation results in a virtual coupling between two partners which, however, can be optionally disconnected again in the operation of the network system. The released partners can then be allocated to other partners in virtual manner. The transmitting frequency is arranged, for example, in the megahertz range. The microphone modules must share the available transmitting frequencies frequently with other first-class transmitters such as, for example, television transmission so that a particularly important role attaches to the distribution of the transmitting frequencies. With regard to the transmitting power, it must be noted that up to now, this is rigidly adjustable, frequently only in three stages (low, middle, high). When the transmitting power is allocated to the configuration data, the transmitting power can also be adapted dynamically, for example several times per second and/or continuously.

In a preferred development of the invention, the control device has a frequency analysis module which is designed for testing the transmitting frequency spectrum and determining the available transmitting frequencies/or the quality of the available transmitting frequencies. For example, it is checked whether they are free and whether other ones are interfering with this frequency. The transmitting frequency spectrum can be tested, on the one hand, before commissioning of the network system and, on the other hand, during the operation of the network system. It is also conceivable that a transmitting frequency is specified sequentially for each microphone module-base station allocation during the generation of the configuration data and is then activated. Before the configuration data are specified for another allocation, the transmitting frequency spectrum is checked again. It is thus possible, on the one hand, that a blank measurement is carried out wherein the microphone modules are deactivated, and, on the other hand, a measurement with partially or completely activated microphone modules. Generally, it can be provided that the result of the test of the transmitting frequency spectrum is taken into consideration in the adaptation of the configuration data.

In a development of the invention, it can be provided that the control device has a reception analysis module which is designed for analyzing status data of the base station such as the actual quality of reception of the microphone modules. The results of the reception analysis module can be used advantageously, for example, in the case of power management. During the operation, a continuous, central power management is very advantageous, for example. In this context, the individual transmitting powers are adapted dynamically in all microphone modules and the reception is thus distinctly improved for all microphone modules. This is particularly important in the case of microphone modules with transmitters which are directly adjacent to one another in neighboring channels. A greatly different received power can here noticeably impair the quality of reception in the base stations or even render the reception quite impossible. In an optionally supplementary way, the power management can also be carried out locally in each microphone module-base station allocation. However, it is not possible to recognize and utilize any correlation between the individual allocations with the local power management. It is only a joint, particularly centralized evaluation which provides for the best regulation for the overall system. To carry out the power management, the quality of reception of the individual microphone modules is continuously transmitted to the control device from the individual microphone module-base station allocations. Criteria for the quality of reception can be, for example, the received power of the microphone module, the baseband energy, channel bit error rate, the bit error rate and/or the current transmitting power of the microphone module. By means of these data and the occupancy of the radio channels, the control device can determine the optimum transmitting power of the individual microphone modules. In this context, the criteria just listed can also be included. As soon as these data are taken into consideration in the configuration data, these are then conveyed to the base stations and the microphone modules connected which adapt their transmitting power correspondingly. For the purpose of analysis, the control device has the reception analysis module which is designed for analyzing the said status data via the actual quality of reception, the configuration data being adapted taking into consideration the analysis results.

In an advantageous development of the invention, the control system has a database with usage profiles for defining the purpose of use for at least one of the microphone modules. This embodiment allows at least one, some or each microphone module, and thus each user, to be classified in accordance with various criteria. In a particularly preferred manner, the usage profile comprises a priority parameter, a nominal quality parameter and/or a distance parameter. In the case of the priority parameter, it can be taken into consideration that some transmissions, for example by soloists, are more important than other ones, for example background instruments. The microphone modules with the transmissions having the higher priority are assigned, e.g., the configuration data which provide for a more reliable transmission quality.

The nominal quality parameter takes into consideration that some transmissions need a higher quality of the audio information such as, for example, grand pianos, than other transmissions, for example speech in the case of presentation. The microphone modules with the transmissions having the higher quality requirement are assigned the configuration data which ensure a higher transmission quality. As a supplement, it can also be provided that transmissions having a lower nominal quality parameter are compressed more severely. The data rate saved makes it possible to increase the error protection in the transmission so that these transmissions can also be transmitted without losses on poorer frequencies. Instead of increasing the error protection, the transmitter bandwidth can also be reduced. Thus, it is possible to set up more radio channels overall or this radio channel can transmit in narrower, good frequency gaps.

The quality of the radio transmission usually decreases with distance. It is therefore appropriate to allocate configuration data for a better transmission to the microphone modules which have more remote locations from the allocated base stations. It is particularly advantageous if adjacent transmitting frequencies are assigned to microphone modules having similar distances so that interference with one another is minimized. Microphone modules having a great spatial distance from one another are, by contrast, to be placed at a relatively large distance away from one another in the transmitting frequency spectrum. This minimizes the power difference between adjacent radio channels so that the quality of reception is increased in the case of base stations located at the same place or adjacently.

It is particularly preferred if the control device is designed for iteratively adapting and/or optimizing the configuration data in the operation of the network system. As a result, the network system is capable of not only responding to a total failure of a microphone module due to a disturbed transmission link but also achieving small quality-enhancing changes.

One possible option of the network system can be formed by an environmental module, the environmental module holding characteristic data about the environment of the network system. The environmental module takes into consideration the circumstance that the situation of reception of the microphone module-base station allocations changes due to the movement of the microphone modules with respect to the base stations and possibly due to changes in the environment.

A first option of supplying the environmental module with corresponding environmental data is implemented by the fact that the environmental module is designed for carrying out a test program. In the test program, tests are performed on the planned routes ("walk path tests"). In this context, the microphone module is moved along the same routes as later in the planned operation. The quality of reception is recorded continuously and with reference to time, then evaluated and, taking into consideration these results, the configuration data are adapted, especially with regard to the transmitting frequency and/or the transmitting power. If necessary, this procedure is repeated iteratively. By means of a centralized evaluation of the control device, characteristics of the individual microphone module-base station allocations can be determined and taken into consideration, for example in frequency management. Thus, the distance parameter can be determined better in the usage profile. Temporary dips in the reception are known due to the test program and—if frequency-selective—can be prevented by selecting other transmitting frequencies for these microphone modules.

A second option for the teaching-in of the environmental module is a continuous time-related recording of the quality of reception and of the adjustments in the case of repetitive performances. In a play, for example, the same or at least very similar routes are normally walked with each performance. A subsequent evaluation can demonstrate problems of reception. Thus, continuous optimization of the microphone modules is possible.

In a development of the invention, the control device has a switching module which is designed for changing the transmitting frequency and/or the configuration data of a single microphone module-base station allocation. If the quality of reception becomes drastically poorer in the course of a transmission due to a change of location of the microphone module or due to new interference signals, it is preferably attempted initially by means of a change in power to compensate for it. If this is not sufficient for an optimum transmission, the transmitting frequency is changed by the switching module. In a particularly preferred manner, the change of transmitting frequency is carried out in such a manner that a transmission of the audio information without interruption is achieved. The switching module is preferably coupled to the frequency analysis module which looks continuously for free transmitting frequencies. If a reduced quality of transmission is found for a microphone module-base station allocation (for example by means of a bit error rate), this allocation is switched at a suitable time to another, free transmitting frequency assigned by the control device.

An immediate switch-over can take place, for example, in the case of a greatly reduced transmission quality. This is the case especially when the audio signal is already greatly interfered with and a short interruption can be accepted. Among other things, the following two options exist for switching without interruption: firstly, one or several symbols which are not utilized for the data transmission can be used in the case of a digital transmission. These are, e.g., symbols for channel estimation or synchronization. If these symbols are lost during the switching time from one transmitting frequency to another transmitting frequency, the complete data content can still be decoded in the receiver. The second option is of utilizing an interruption in the audio signal. For this purpose, the microphone module has to evaluate the audio signal and determine when the power of the audio signal is very low so that an interruption cannot be perceived. This gap in the audio signal is utilized for switching to another transmitting frequency.

A further optional supplement relates to a handover module which changes the allocation of the base station microphone module. In particular, the allocation of a microphone module to a first base station is changed to an allocation of the same microphone module to a second base station. Fields of application can be seen when base stations are sited at different locations or in different rooms, respectively. If an approaching problem with reception is signaled by a base station, for example due to a cross modulation, the control device can set free base stations, that is to say base stations which are currently without allocation to a microphone module, to the appropriate transmitting frequency and there measure the quality of reception. This can also be done independently of problems, simply in order to find the base station having the better quality of reception. When a free base station having a better quality of reception is found, it can take over the audio signal from the microphone module. There is thus a change of the receiver site but not a change of transmitting frequency. Further fields of application are found, for example, in the case of a guided tour through a number of rooms using only one microphone module or an area can be covered which is far greater than the normal range of an individual base station. It is also possible to operate with lower transmitting powers of the microphone modules overall if the base stations are distributed in space since the distance between microphone module and base station becomes less.

BRIEF DESCRIPTION OF THE DRAWINGS

Further features, advantages and effects of the invention are found in the description following of a preferred exemplary embodiment of the invention, in which.

DETAILED DESCRIPTION

Figure 1:
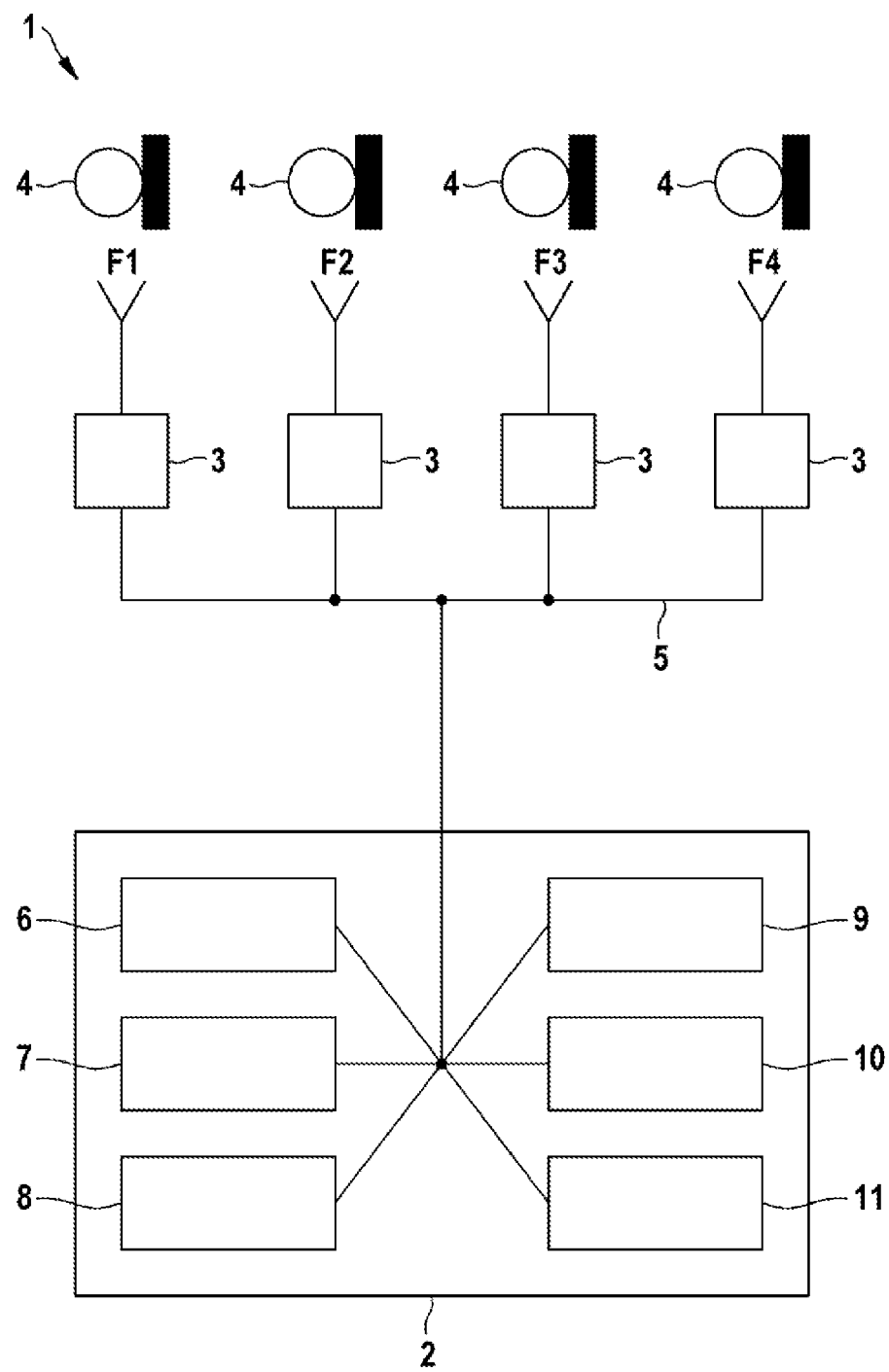
FIG. 1 shows a schematic block diagram of a network system for audio equipment as a first exemplary embodiment of the invention.

FIG. 1 shows in a highly schematic block diagram a network system 1 which comprises a control device 2, a plurality of base stations 3 and a number of microphone modules 4. The network system 1 is used, for example, in discussions, theater performances, concerts, presentations etc. In this arrangement, the microphone modules 4 are in each case allocated to the actors, moderators, singers, musicians. The microphone modules 4 comprise in each case one microphone via which audio signals are picked up, and a transmitter via which the audio signals are transmitted wirelessly as audio information to in each case one associated base station 3. For the transmission, transmitting frequencies are used, each microphone module 4—base station 3 allocation obtaining a different frequency F1, F2, F3, F4 etc. The audio information is forwarded by the base stations 3 in a manner not shown in greater detail to amplifiers, recording devices etc.

The communication between the base stations 3 and the microphone modules 4 is parameterized by means of configuration data, the configuration data initially comprising the allocation between microphone module 4 and base station 3, a transmitting frequency F1 . . . F4, a transmitting power (low, middle, high or continuous) and transmission parameters. It can also be provided that only a part of these data is contained in the configuration data. The configuration data are generated by the control device 2 as will still be explained in the text which follows, and distributed to the base stations 3 via a network 5. The network 5 can have any network topology, especially ring, line etc., and can also be wire-connected or wireless. It can use its own proprietary protocol or a protocol based on the IP protocol. In an optionally supplementary manner, the audio information is also transported via the network 5.

The control device 2 is designed in the form of a program and/or of a circuit in order to generate, and distribute via the network 5, the configuration data records for, in particular, all allocations of the base station 3—microphone module 4. The configuration data records are distributed directly to the base stations 3 via the network 5. The configuration data records are then either adjusted manually at the microphone modules 4 or transferred via another channel from the base stations or other network components to the microphone modules 4. Furthermore, the network 5 can be used for transporting status information about the quality of reception etc., from the base stations 3 or the microphone modules 4, respectively, to the control device 2.

The control device 2 comprises a plurality of modules which will be explained in the text which follows. Whilst all modules are provided in this exemplary embodiment, only a part of the modules can also be implemented in other exemplary embodiments. The modules can be either designed as an integral part of the control device 2 or implemented as external modules which then forward their data via corresponding interfaces and/or the network 5 to the control device 2. The control device 2 can be designed as separate device such as, for example, a PC. In other exemplary embodiments, the control device 2 is integrated in one of the base stations 3.

A frequency analysis module 6 is designed for checking the possible frequency spectrum including comprising the transmitting frequencies F1 . . . F4 and detecting free or available transmitting frequencies and/or their quality. Such a frequency analysis can be carried out, on the one hand, before the commissioning of the network system 1 as an initialization step in order to find free transmitting frequencies, in principle. It is also possible that the frequency analysis is carried out during the operation in order to obtain new findings about free transmitting frequencies and/or their qualities, taking into consideration the activated base stations 3—microphone module 4 allocations. The results of the frequency analysis module 4 are taken into consideration in the arrangement of the configuration data.

A reception analysis module 7 checks continuously and/or regularly and/or more frequently the quality of reception of the microphone modules 4 of the individual allocations. Criteria for the quality of reception can be, for example, the received power of the microphone modules 4 at the base stations 3, the baseband energy, the channel bit error rate, the bit error rate and/or the current transmitting power of the microphone module. These results, too, can be taken into consideration in the arrangement of the configuration data.

A usage profile module 8 comprises a database in which usage profiles and/or criteria are stored which relate to the intended use of the respective microphone module 4. For example, a usage profile of a microphone module 4 comprises a priority parameter, a nominal quality parameter and/or a distance parameter. By means of microphone modules 4 individualized in this manner, the configuration data can be calibrated in such a manner that more important microphone modules 4 have a better reception and less important microphone modules 4 are treated as lower-ranking.

An environmental module 9 comprises a further database which contains information about the operational environment of the network system 1, particularly of the microphone modules 4 and of the base stations 3, respectively. The environmental module 9 holds information about the specific environment such as, for example, areas of shading, interferences etc.

A switching module 10 is used for switching a base station 3—microphone module 4 allocation from a first transmitting frequency FX to a second transmitting frequency FY if this is considered to be necessary, for example due to interferences.

Figure 2:
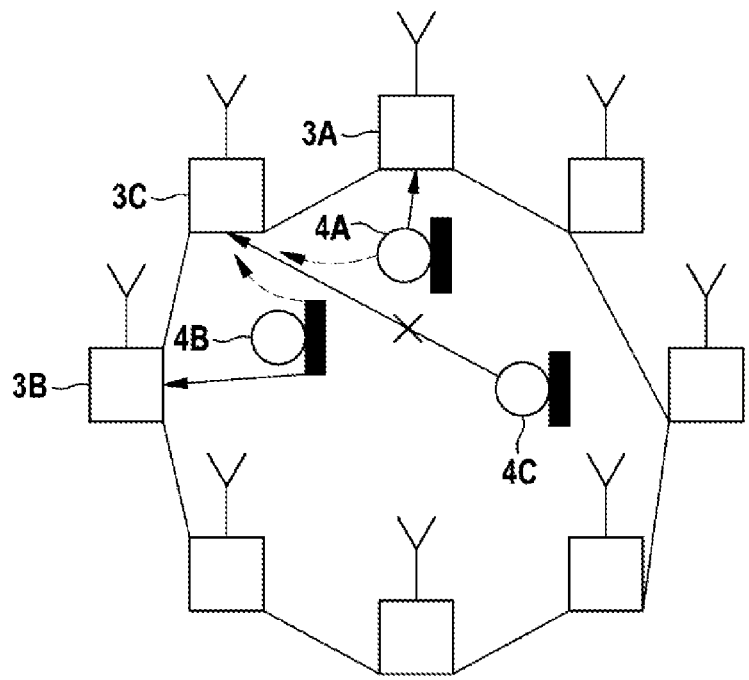
FIG. 2 shows a schematic representation of a possible topology of the network system in FIG. 1.
Figure 3:
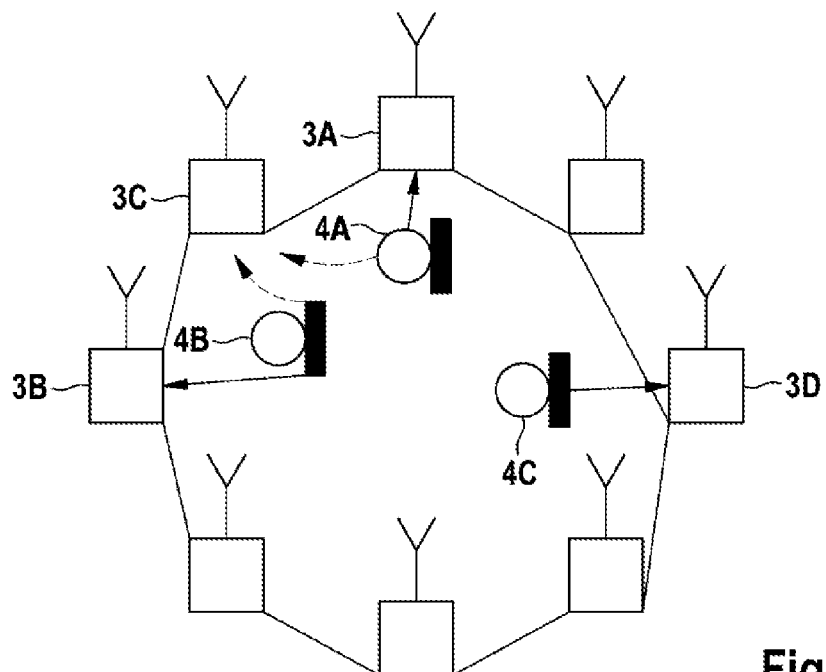
FIG. 3 shows the network system in FIG. 2 after a switching process.

A handover module 11 is designed for enabling a microphone module 4 to change from a first base station 3 to a second base station 3'. This change is necessary, for example, when the microphone module 4 is carried out of the reception area of the first base station 3 and into the reception area of the further base station 3'. It is also possible when a base station 3 is overshadowed by other microphone modules 4 due to cross modulations. These situations are shown in FIGS. 2 and 3, the network system 1 being shown here in a ring topology. In FIGS. 2 and 3, corresponding parts carry corresponding reference numbers to those in FIG. 1.

In FIG. 2, the initial position is shown wherein a first base station 3A is allocated to a first microphone module 4A, a second base station 3B is allocated to a second microphone module 4B and a third base station 3C is allocated to a third microphone module 4C. If the microphone modules 4A,B are positioned close to the base station 3C in location, so-called cross modulations, that is to say interferences can be produced in the transmitting frequency of the microphone module 4C due to an unfavorable choice of transmitting frequency and of the transmitting power. In this case, the interference is picked up by the reception analysis module 7 and the switching module 10 implements a switch-over of the base station 3C allocated to the microphone module 4C to a new base station 3D which offers better conditions of reception for the audio information. This transition is shown in FIG. 3.

By means of the network system 1, a plurality of applications can be implemented:

Application: Frequency Management

In frequency management, the usage profile module 8 is used, on the one hand, for allocating each microphone module 4 its own usage profile. To carry out the frequency management, the available frequency spectrum is first checked by the frequency analysis module 6 and the quality of all radio channels is determined, for example whether they are free and whether others interfere with these frequencies. By means of the usage profile, the radio channel quality and all relevant intermodulation products, the control device 2 determines the optimum distribution of the microphone modules 4 to the available channels (transmitting frequencies) and performs any adaptation of the transmission parameters such as audio quality or error protection, which may be necessary. This information is then conveyed as configuration data to the base stations 3 and the microphone modules 4. As an alternative, a transmitting frequency can be specified sequentially for each microphone module 4 and this can then be set at the microphone module 4. This does not require any calculation of the frequencies with intermodulation products; instead, free transmitting frequencies can be checked out anew in the meantime in each case by the frequency analysis module 6. Following this, an unambiguous allocation of the microphone modules 4 to the respective users is necessary since the microphone modules 4 are no longer arbitrarily interchangeable but have defined characteristics due to the user profiles. The frequency management is normally carried out once during initialization but can also be adapted several times and/or iteratively during the transmissions, that is to say in operation.

Application: Analysis of the Situation of Reception

To determine the quality of the available radio channels, it is not sufficient to scan them once statically. The situation of reception changes due to the movement of the microphone modules 4 with respect to the base stations 3 due to the change in the environment. This dynamic is detected by test programs and taken into consideration in the determination of the configuration data. This function is implemented in the environmental module 9. To determine this dynamic nature of the system, tests are carried out on the paths walked.

In a first option, the microphone modules are moved on the same routes as later in operation, the quality of reception being recorded and subsequently evaluated. This evaluation represents the basis for the adaptation of the configuration data, wherein all allocations can be analyzed jointly by a centralized evaluation by the control device 2 and their interactions and/or mutual influences can also be taken into consideration. In particular, microphone modules 4 having similar reception powers over time can be detected in the reception analysis module 7 and defined as co-located by the environmental module 9 even when they are actually separated in location, similar transmitting powers being allocated to them in the case of close transmitting frequencies. In the case of changes in the configuration data, it may prove to be necessary that the test is carried out again.

A second option is that the qualities of reception are recorded by the reception analysis module 7 during repeated performances. During the performances, the same or at least similar routes are normally walked. A subsequent analysis of the recorded data by the environmental module 9 can be a basis for an iterative optimization of the configuration parameters.

Application: Power Management

During the operation, a continuous, centralized power management is very advantageous. In this context, the individual transmitting powers in the configuration data records are adapted dynamically in all microphone modules 4 and thus the reception is distinctly improved for all microphone module 4—base station 3 allocations. This is of importance, particularly in the case of microphone modules 4 which are located directly adjacently to one another in neighboring channels with the transmitting frequencies. In this case, a greatly differing received power can noticeably impair the quality of reception or even render the reception quite impossible. Although power management is also possible locally separately in each allocation, no correlations between the individual allocations can be detected and utilized in this arrangement. It is only the centralized evaluation by the control device 2 which provides for the best regulation beyond system boundaries. To carry out the power management, the quality of reception of the individual allocations is monitored continuously by the reception analysis module 7. Criteria for the quality of reception can be, e.g., the received power of the transmitter, the baseband energy, channel bit error rate, the bit error rate and/or the current transmitting power of the microphone module 4. Using these data, the control device 2 can adjust the optimum transmitting powers in the configuration data. The changed configuration data are transmitted preferably via a suitable return channel between base station 3 and microphone module 4.

Application: Dynamic Frequency Allocation

If the quality of reception worsens dramatically in the course of a transmission due to a change of location of the microphone module 4 or due to new interference signals, it is attempted first to compensate for this by means of the power management. If this is not sufficient for optimum transmission, it may be necessary to change the transmitting frequency $F_1 \ldots F_X$ of individual allocations. This change is implemented by the switching module 10. In this context, the frequency analysis module signals at least one free transmitting frequency to the control device 2. If a reduced transmission quality is found for an allocation, the switching module 10 initiates a switch-over of the allocation to the free frequency. The time of switching is carried out, e.g. during the period of the transmission of a redundant signal component, during a pause in the audio signal and/or immediately.

Application: Handover

During a handover, base stations 3 are sited at different locations or in different rooms. If a base station 3 reports an approaching problem of reception, for example due to a cross modulation, the control device 2 can set by means of the handover module 11 free base stations, that is to say base stations 3 currently without allocated microphone module 4, to the corresponding transmitting frequency of the microphone module 4 and there measure the quality of reception. This can also be done independently of problems, simply in order to find the base station having the better quality of reception. If a free base station having a better quality of reception is found, this can take over the microphone module 4 so that a new base station 3—microphone module 4 allocation is formed. By means of the handover module 11, a guidance through several rooms with only one microphone module 4 becomes possible, e.g., or a greater area can be covered which is far greater than the normal range of an individual base station 3. Furthermore, it is possible to work with a lower transmitting power if the base stations are distributed in space.

The invention claimed is:

1. A network system (1) for audio equipment (4) comprising a number of base stations (3) and a number of microphone modules (4), wherein the microphone modules (4) configured to be allocated to the base stations (3) via configuration data and wherein each microphone module (4) of a microphone module-base station allocation is designed for transmitting audio information on a transmitting frequency (F1, F2, F3, F4, FX, FY) to the associated base station (3) of the same microphone module-base station allocation, wherein the base stations (3) are networked together so that the configuration data are exchangeable, comprising a control device (2), wherein the control device (2) is designed in the form of a program or of a circuit to select or adapt the configuration data of the base stations (3) or of the microphone modules (4) or of the microphone module-base station allocations in automated manner, characterized in that the control device (2) is designed for setting the configuration data, and has a frequency analysis module (6) which is designed for testing the transmitting frequency spectrum during the initialization or in operation of the network system, and determining the available transmitting frequencies or the quality of the available transmitting frequencies, wherein the configuration data are adapted taking into consideration available transmitting frequencies or taking into consideration a quality of the available transmitting frequencies.

2. The network system (1) as claimed in claim 1, characterized in that the configuration data comprise a microphone module-base station allocation, a transmitting frequency, a transmitting power or transmission parameters.

3. The network system (1) as claimed in claim 1, characterized in that the control device (2) has a reception analysis module (7) which is designed for analyzing status data of the base stations (3) via an actual quality of reception, wherein the configuration data are adapted taking into consideration the analysis results.

4. The network system (1) as claimed in claim 1, characterized in that the control device (2) holds a usage profile for a definition of a purpose of use for at least one of the microphone modules (4), wherein the configuration data are adapted taking into consideration the usage profile.

5. The network system (1) as claimed in claim 4, characterized in that the usage profile comprises a priority parameter, a nominal quality parameter or a distance parameter.

6. The network system (1) as claimed in claim 1, characterized in that the control device (2) is designed for an iterative or a regular adaptation of the configuration data in operation.

7. The network system (1) as claimed in claim 1, characterized in that the control device (2) has an environmental module (9), wherein the environmental module (9) holds characteristic data about the environment, especially with regard to a quality of reception, of the network system (1).

8. The network system (1) as claimed in claim 7, characterized in that the characteristic data about the environment are detected in the operation of the network system or generated by a test procedure.

9. The network system (1) as claimed in claim 1, characterized in that the control device (2) has a switching module (10) which changes, preferably event-controlled, a transmitting frequency or a configuration data of a base station-microphone module allocation.

10. The network system (1) as claimed in claim 1, characterized in that the control device (2) has a handover module (11) which is designed for changing the base station-microphone module allocation.

11. A method for configuring a network system (1), as claimed in claim 1, comprising a number of base stations (3) and a number of microphone modules (4), wherein the microphone modules (4) are allocated to the base stations via configuration data and wherein each microphone module (4) of a microphone module-base station allocation is designed for transmitting audio information on a transmitting frequency to the associated base station (3) of the same microphone module-base station allocation, wherein the base stations (3) exchange configuration data via a network (5) and wherein the configuration data are adapted or generated.

12. A computer program comprising program code configured to perform the steps of the method as claimed in claim 11 when the program is executed on a computer.

13. The network system (1) as claimed in claim 11, characterized in that the configuration data are adapted or generated based on interactions of the microphone module-base station allocations.

14. The network system (1) as claimed in claim 11, characterized in that the configuration data are adapted or generated based on a purpose of use of a respective microphone module (4).

15. The network system (1) as claimed in claim 1, characterized in that setting the configuration data includes selecting or adapting the configuration data.

16. The network system (1) as claimed in claim 1, characterized in that setting the configuration data is based on interactions of the microphone module-base allocations.

17. The network system (1) as claimed in claim 16, characterized in that the interactions of the microphone module-base allocations are measured or calculated.

18. The network system (1) as claimed in claim 1, characterized in that setting the configuration data is based on a purpose of the use of a respective microphone module (4).

19. A network system (1) for audio equipment (4) comprising a number of base stations (3) and a number of microphone modules (4), wherein the microphone modules (4) configured to be allocated to the base stations (3) via configuration data and wherein each microphone module (4) of a microphone module-base station allocation is designed for transmitting audio information on a transmitting frequency (F1, F2, F3, F4, FX, FY) to the associated base station (3) of the same microphone module-base station allocation, wherein the base stations (3) are networked together so that the configuration data are exchangeable, comprising a control device (2), wherein the control device (2) is designed in the form of a program or of a circuit to select or adapt the configuration data of the base stations (3) or of the microphone modules (4) or of the microphone module-base station allocations in automated manner, characterized in that the control device (2) is designed for setting the configuration data, and holds a usage profile for a definition of a purpose of use for at least one of the microphone modules (4), wherein the configuration data are adapted taking into consideration the usage profile.

20. A network system (1) for audio equipment (4) comprising a number of base stations (3) and a number of microphone modules (4), wherein the microphone modules (4) configured to be allocated to the base stations (3) via configuration data and wherein each microphone module (4) of a microphone module-base station allocation is designed for transmitting audio information on a transmitting frequency (F1, F2, F3, F4, FX, FY) to the associated base station (3) of the same microphone module-base station allocation, wherein the base stations (3) are networked together so that the configuration data are exchangeable, comprising a control device (2), wherein the control device (2) is designed in the form of a program or of a circuit to select or adapt the configuration data of the base stations (3) or of the microphone modules (4) or of the microphone module-base station allocations in automated manner, characterized in that the control device (2) is designed for setting the configuration data, and has a switching module (10) which changes, preferably event-controlled, a transmitting frequency or a configuration data of a base station-microphone module allocation.

21. A network system (1) for audio equipment (4) comprising a number of base stations (3) and a number of microphone modules (4), wherein the microphone modules (4) configured to be allocated to the base stations (3) via configuration data and wherein each microphone module (4) of a microphone module-base station allocation is designed for transmitting audio information on a transmitting frequency (F1, F2, F3, F4, FX, FY) to the associated base station (3) of the same microphone module-base station allocation, wherein the base stations (3) are networked together so that the configuration data are exchangeable, comprising a control device (2), wherein the control device (2) is designed in the form of a program or of a circuit to select or adapt the configuration data of the base stations (3) or of the microphone modules (4) or of the microphone module-base station allocations in automated manner, characterized in that the control device (2) is designed for setting the configuration data, and has a handover module (11) which is designed for changing the base station-microphone module allocation.

\* \* \* \* \*